United States Patent
Ayling

(10) Patent No.: US 10,944,538 B2
(45) Date of Patent: Mar. 9, 2021

(54) SYSTEM AND METHOD FOR ENCODING AND DECODING COMMUNICATION SIGNALS

(71) Applicant: BAE SYSTEMS plc, London (GB)

(72) Inventor: Stephen Gerard Ayling, Chelmsford (GB)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 16/866,817

(22) Filed: May 5, 2020

(65) Prior Publication Data
US 2020/0358591 A1 Nov. 12, 2020

(30) Foreign Application Priority Data

May 8, 2019 (EP) ..................................... 19275063
May 8, 2019 (GB) ..................................... 1906459

(51) Int. Cl.
*H04L 7/00* (2006.01)
*H04B 10/67* (2013.01)
*H04B 10/524* (2013.01)
*H04B 10/11* (2013.01)

(52) U.S. Cl.
CPC ............ *H04L 7/0075* (2013.01); *H04B 10/11* (2013.01); *H04B 10/524* (2013.01); *H04B 10/676* (2013.01)

(58) Field of Classification Search
CPC ..... H04L 7/0075; H04B 10/11; H04B 10/524; H04B 10/676
USPC .......................................................... 398/131
See application file for complete search history.

(56) References Cited

U.S. PATENT DOCUMENTS

| | | | | |
|---|---|---|---|---|
| 4,648,133 A | * | 3/1987 | Vilnrotter | ............. H04L 7/0066 329/313 |
| 5,185,766 A | | 2/1993 | Cho | |
| 5,241,961 A | | 9/1993 | Henry | |
| 5,353,303 A | * | 10/1994 | Walthall | ................. H04B 1/707 332/112 |

(Continued)

FOREIGN PATENT DOCUMENTS

| | | |
|---|---|---|
| DE | 10310129 B3 | 10/2004 |
| EP | 3370365 A1 | 9/2018 |
| WO | 2013002259 A1 | 1/2013 |

OTHER PUBLICATIONS

"Pulse-position modulation". Wikipedia, Published Feb. 11, 2019. 4 pages.

(Continued)

*Primary Examiner* — Dalzid E Singh
(74) *Attorney, Agent, or Firm* — Finch & Maloney PLLC

(57) ABSTRACT

Systems and methods for encoding a data signal as a pulse position modulation (PPM) signal and decoding a PPM signal to output the original data signal. The method of encoding may comprise receiving an input data signal; converting the data within the input data signal to a sequence of PPM symbol values; and generating a PPM signal comprising an alternating sequence of synchronisation pulses and data pulses. The PPM signal may be generated by generating a plurality of synchronisation pulses at a fixed pulse repetition rate; and generating a sequence of data pulses with each data pulse having a time delay from a preceding synchronisation pulse, whereby the sequence of data pulses represent the sequence of PPM symbol values.

20 Claims, 4 Drawing Sheets

(56) References Cited

U.S. PATENT DOCUMENTS

| | | | |
|---|---|---|---|
| 5,453,742 A | 9/1995 | Cox | |
| 2002/0150118 A1* | 10/2002 | Zinke | H04L 25/4902 370/442 |
| 2008/0112512 A1* | 5/2008 | Ekbal | H04B 1/7176 375/340 |
| 2018/0097568 A1* | 4/2018 | Collins | H04B 10/11 |

OTHER PUBLICATIONS

GB Search Report under Section 17(5) received for GB Application No. 1906459.1 dated Oct. 9, 2019. 3 pages.
Extended European Search Report received for EP Application No. 19275063.6, dated Nov. 22, 2019. 8 pages.

* cited by examiner

SYSTEM AND METHOD FOR ENCODING AND DECODING COMMUNICATION SIGNALS

RELATED APPLICATION

This application claims foreign priority under 35 U.S.C. § 119 to Application No. GB 1906459.1 filed in the UK Intellectual Property Office on 8 May 2019, as well as Application No. EP 19275063.6 filed in the European Patent Office on 8 May 2019. Each of these applications is herein incorporated by reference in its entirety.

BACKGROUND

The present disclosure relates generally to a method and system for encoding communication signals, for example for free space optical communications.

Pulse-position modulation (PPM) is a known form of signal modulation which may be used to encode message bits which are to be transmitted from a transmitter to a receiver. An example PPM packet which is to be transmitted is illustrated in FIG. 1. Each PPM packet comprises a plurality of frames each of which comprises a single pulse. The time of arrival of the pulse is used to encode the value of a message bit.

As shown in the expanded portion of FIG. 1, each frame comprises a plurality of slots and a single pulse appears in one of the plurality of slots. This part of the frame may be termed a PPM symbol. In this image, only six slots are shown with the pulse appearing in the third slot but this is merely to illustrate standard PPM. The number of slots relates to the number of message bits which are to be encoded. If there are M message bits, there are $2^M$ slots. In other words, the range of values that the bit can have depends on the number of time slots that can be populated. The time of arrival of each pulse in each frame is used to determine in which slot the pulse arrived and hence to determine the value of the bit. Thus, in order to determine the symbol value of each bit, it is necessary to know when the zero time slot starts.

Each frame may also comprise a dead-time at the beginning of the frame. The dead-time occurs when a pulse cannot be generated, for example when used in optical communications, this occurs when the optical source is recharging or is otherwise unavailable for triggering. The dead-time together with the PPM symbol form a complete frame of a fixed length. The symbol period is the combined dead-time and the length of the PPM symbol.

One of the key difficulties of implementing this technique is that of accurate decoding, the time of arrival of the pulse must be precisely measured to ensure that the pulse is allocated to the correct slot and hence decoded as the correct bit. It is thus necessary to properly synchronize the clock in the receiver with the clock in the transmitter. Thus, as shown each PPM packet starts with a series of synchronisation pulses to synchronize the clocks. Successful decoding also relies upon the transmitter and receiver clocks remaining in synch after the initial synchronisation phase. Some minor retiming may be accomplished by centring each pulse in its respective time slot.

Alternatively, PPM is often implemented differentially as differential pulse-position modulation (D PPM). An example differential PPM packet which is to be transmitted is illustrated in FIG. 2. As in PPM, the DPPM packet comprises a plurality of frames each of which comprises a single pulse and a synchronisation signal before the plurality of frames. Each frame begins with some dead-time followed a plurality of slots with a data pulse occurring in one slot. In differential PPM, the PPM symbol length is not fixed and the number of slots is varied to encode each message bit. The pulse always appears in the last slot which is used.

Successful decoding still relies on the transmitter and receiver clocks remaining in synchronisation for the receiver to correctly determine how many slots have been received and hence correctly decode the bit. The clocks are resynchronised when the pulse is received and re-zeroed and the time of the next pulse is therefore measured from the last received pulse time.

A combination of low pulse repetition rates, e.g. frequencies of below 1 kHz, long dead times, e.g. greater than 1 ms and short time slots, e.g. less than 10 µs, means that the timing accuracy between the receiver and transmitter clocks becomes very challenging for both PPM and DPPM. This requires the use of expensive, large and highly stable clocks (e.g. oven controlled or temperature compensated crystal oscillators (OCXO or TXCO).

It is an example aim of example embodiments of the present disclosure to at least partially overcome or avoid one or more problems of the prior art, whether identified herein or elsewhere, or to at least provide an alternative to existing systems and related methodologies.

SUMMARY

According to a first aspect of the present disclosure, there is provided a method for encoding a data signal as a pulse position modulation (PPM) signal, the method comprising receiving an input data signal; converting the data within the input data signal to a sequence of PPM symbol values; and generating a PPM signal comprising an alternating sequence of synchronisation pulses and data pulses by generating a plurality of synchronisation pulses at a fixed pulse repetition rate; and generating a sequence of data pulses with each data pulse having a time delay from a preceding synchronisation pulse, whereby the sequence of data pulses represent the sequence of PPM symbol values.

According to another aspect of the present disclosure, there is also provided a transmitter for transmitting a data signal encoded as a pulse position modulation (PPM) signal, the system comprising a modulator; and a signal generator, wherein the modulator is configured to: receive an input data signal; convert the data within the input data signal to a sequence of PPM symbol values; generate a trigger signal and send the trigger signal to the signal generator and wherein the signal generator is configured to generate the PPM signal comprising an alternating sequence of synchronisation pulses and data pulses on receipt of the trigger signal wherein the PPM signal comprises a plurality of synchronisation pulses at a fixed pulse repetition rate and a sequence of data pulses with each data pulse having a time delay from a preceding synchronisation pulse, whereby the sequence of data pulses represent the sequence of PPM symbol values.

According to another aspect of the present disclosure, there is provided a method for decoding a pulse position modulation (PPM) signal which has been encoded as described above, the method comprising receiving an input pulse position modulation (PPM) signal; detecting each synchronisation pulse within the PPM signal; measuring the time delay from each detected synchronisation pulse to the subsequent data pulse; converting each measured time delay to a PPM symbol value; and converting each PPM symbol value to regenerate the original input data signal.

According to another aspect of the present disclosure, there is also provided a receiver for decoding a pulse position modulation (PPM) signal, the system comprising a demodulator which is configured to receive an input pulse position modulation (PPM) signal comprising an alternating sequence of synchronisation pulses and data pulses wherein the plurality of synchronisation pulses are at a fixed pulse repetition rate and each data pulse has a time delay from a preceding synchronisation pulse; detect each synchronisation pulse within the PPM signal; measure the time delay from each detected synchronisation pulse to the subsequent data pulse; convert each measured time delay to a PPM symbol value; and convert each PPM symbol value to regenerate the original input data signal.

The following aspects apply to each of the methods, transmitter and receiver as appropriate. It will also be appreciated that the transmitter and receiver can be incorporated into a communications system.

Each symbol value may correspond to one of a plurality of time slots, each of which may be less than 10 μs in length. Generating a sequence of data pulses may comprise assigning each data pulse to a time slot. Each time slot may thus be considered to represent one of the PPM symbol values. There may also be an additional synchronisation time slot to which the synchronisation pulse is assigned. This time slot appears before the plurality of time slots for the data pulse.

The PPM signal may comprise dead-time before each synchronisation pulse. Dead-time may be classed as time in which no pulse occurs, e.g. during powering-up of the signal generator. The dead-time may be less than 10 ms and may be greater than 1 ms and may be constant to more accurately determine when the synchronisation pulse arrives. Each period of dead-time together with the time slot for the synchronisation pulse and the plurality of time slots (including one of which contains a data pulse) following each synchronisation pulse may be considered to define a symbol period, e.g. a length of time for each symbol. A plurality of PPM symbols together may create a PPM packet which encodes all the data in the original input data signal.

The symbol period may be fixed, e.g. the number of time slots which follow the dead-time may be constant in a similar manner to convention PPM. Alternatively, the symbol period may be variable. In this arrangement, the time slot to which the data pulse is assigned is the last time slot, i.e. there are no further time slots after the time slot, in a similar manner to DPPM.

For each packet, the dead-time in a symbol is large relative to the slot length and thus timing accuracy is very important to accurately assign a data pulse to the correct slot when decoding the PPM signal. Thus as described above, the time delay is measured from the preceding synchronisation pulse when decoding the PPM signal. Each synchronisation pulse may thus be considered to resynchronise a clock in the receiver with a clock in the transmitter which generated the PPM signal and/or re-zero the receiver clock. Where the symbol period is fixed, the synchronisation pulses may be generated with a pre-set and fixed pulse repetition frequency (PRF) which may be below 1 kHz and may also be below 100 Hz. The PRF may be approximately 20 Hz.

One application for the method may be in free space optical communication. The PPM signal may be an optical signal. The signal generator in the transmitter may comprise a laser source. Similarly, the receiver may be a high speed optical receiver. The demodulator may be further configured to convert the received PPM signal to a plurality of electrical pulses before detecting each synchronisation pulse.

The laser source in the transmitter may comprise a first cavity for generating the plurality of synchronisation pulses and a second cavity for generating the sequence of data pulse. The plurality of synchronisation pulses and the plurality of data pulses may be combined, e.g. in a beam combiner to generate the alternating sequence of synchronisation pulses and data pulses. The trigger signal which is generated by the modulator may comprise a synchronisation pulse trigger signal which is sent to the first cavity and a separate data pulse trigger signal which is sent to the second cavity.

As will be appreciated by one skilled in the art, techniques provided herein may be embodied as a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present disclosure may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Embodiments of the present disclosure also provide a non-transitory data carrier carrying code which, when implemented on a processor, e.g. within the transmitter and/or receiver, causes the processor to carry out any of the methods described herein.

The present disclosure further provides processor control code to implement the methods described herein, for example on a general-purpose computer system or on a digital signal processor (DSP). The present disclosure also provides a carrier carrying processor control code to, when running, implement any of the methods described herein, in particular on a non-transitory data carrier. The code may be provided on a carrier such as a disk, a microprocessor, CD- or DVD-ROM, programmed memory such as non-volatile memory (e.g. Flash) or read-only memory (firmware), or on a data carrier such as an optical or electrical signal carrier. Code (and/or data) to implement embodiments of the techniques described herein may comprise source, object or executable code in a conventional programming language (interpreted or compiled) such as python, C, or assembly code, code for setting up or controlling an ASIC (Application Specific Integrated Circuit) or FPGA (Field Programmable Gate Array), or code for a hardware description language such as Verilog® or VHDL (Very high speed integrated circuit Hardware Description Language). As the skilled person will appreciate, such code and/or data may be distributed between a plurality of coupled components in communication with one another. An embodiment of the present disclosure may comprise a controller which includes a microprocessor, working memory and program memory coupled to one or more of the components of the system.

It will be appreciated that any one or more features described in relation to an aspect of the present disclosure may replace, or be used in combination with, any one or more features described in relation to another aspect of the present disclosure, unless such replacement or combination would be understood by the skilled person as mutually exclusive, after a reading of this disclosure. In particular, any features described in relation to apparatus-like aspects may be used in combination with, or in place of, any features described in relation to method-like aspects. They may also be carried out in any appropriate order.

BRIEF DESCRIPTION OF THE FIGURES

For a better understanding of the present disclosure, and to show how embodiments of the same may be carried into effect, reference will now be made, by way of example, to the accompanying diagrammatic figures in which.

DETAILED DESCRIPTION

Figure 1:
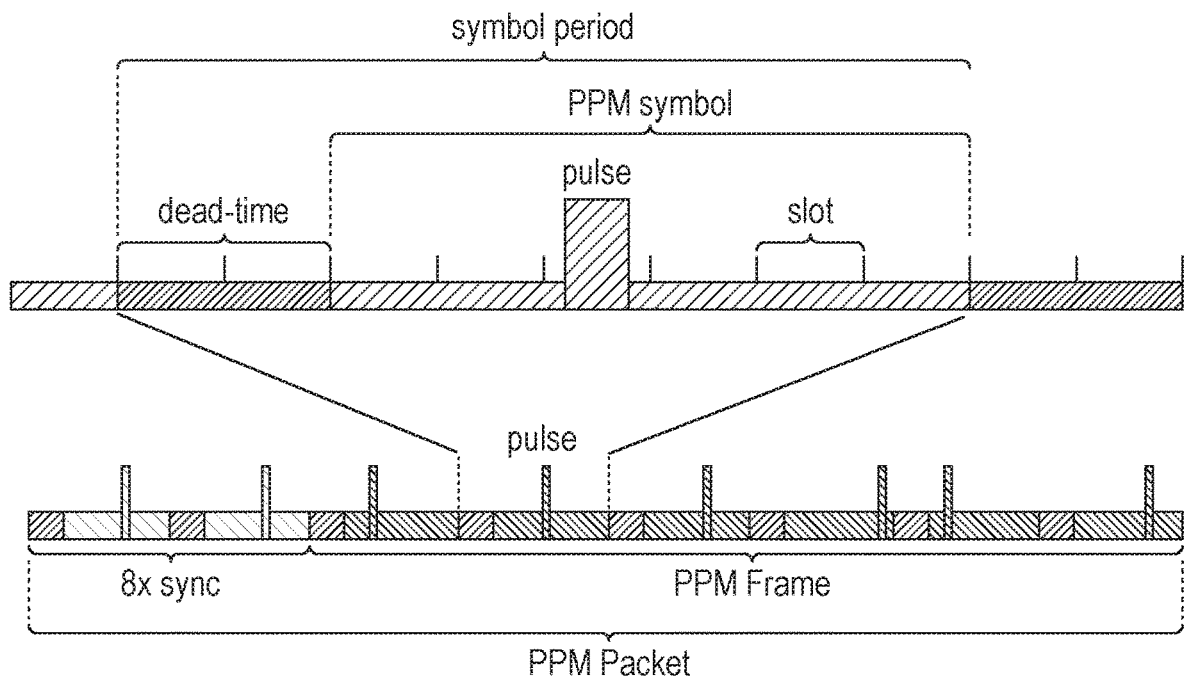
FIG. 1 is a schematic image of a conventional PPM packet.
Figure 2:
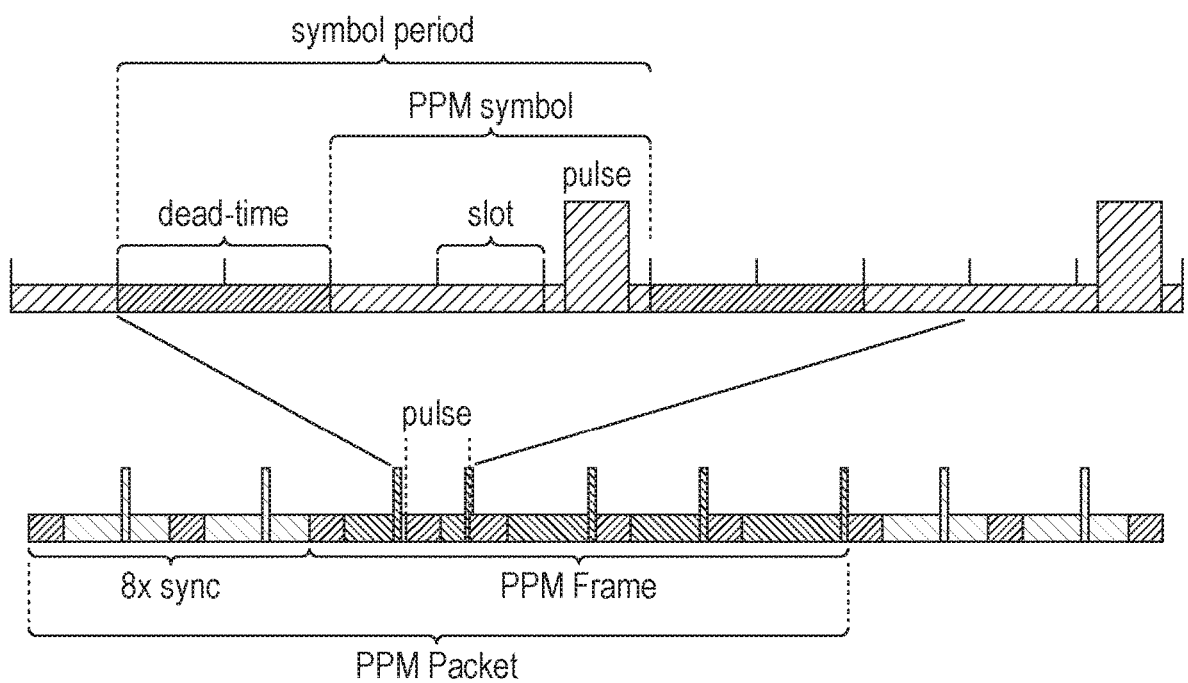
FIG. 2 is a schematic image of a conventional differential PPM packet.

As explained above, FIGS. 1 and 2 show example encoded packets for PPM and DPPM respectively.

Figure 3:
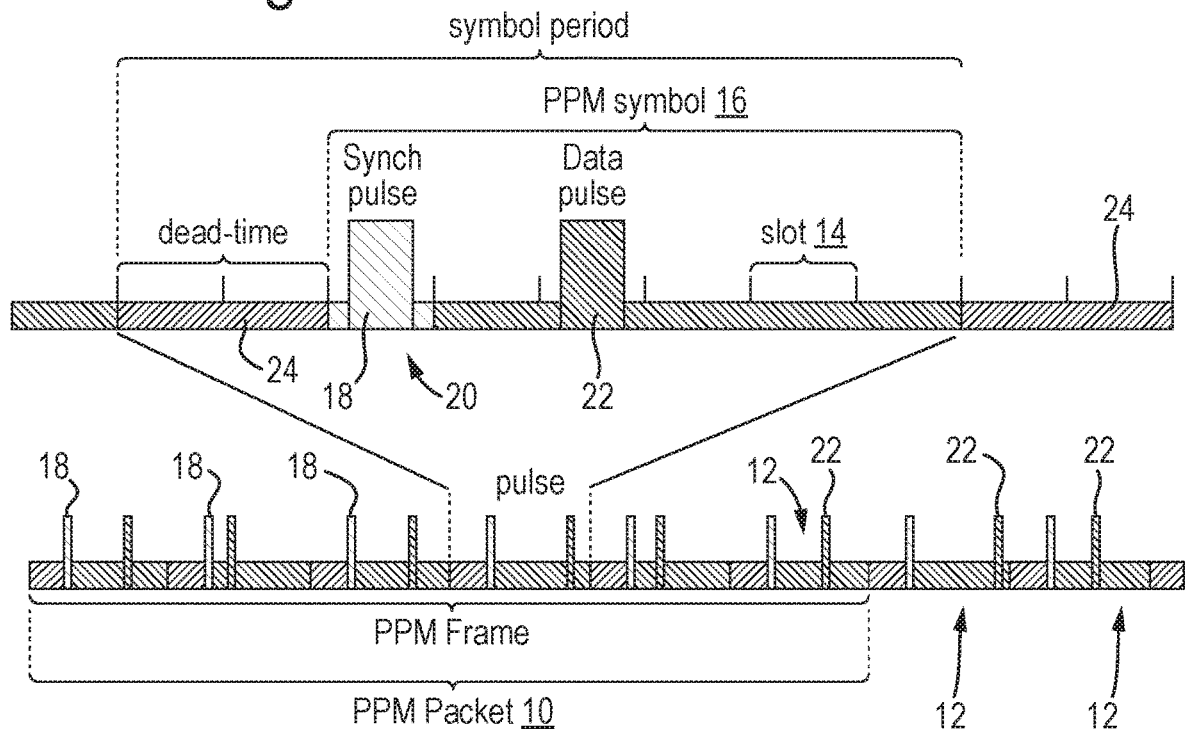
FIG. 3 is a schematic image of an encoded packet according to an embodiment the present disclosure.

FIG. 3 shows a PPM waveform according to an embodiment of the present disclosure. As can be seen, each PPM packet 10 comprises a PPM frame 12. As shown in the expanded portion of FIG. 3, each frame 12 comprises a plurality of slots 14, 20 which are preceded by dead-time 24. The plurality of slots 14, 20 may be termed a PPM symbol 16 and the dead-time and slots together define a symbol period. The length of the PPM symbol 16 may be fixed (i.e. the number of slots may be constant and fixed) as with conventional PPM or variable (with a different number of slots) as in differential PPM. The dead-time 24 is constant so it is possible to approximately predict the arrival time of the first slot.

Unlike conventional PPM and DPPM, there is no synchronisation pulse at the start of each PPM packet. Instead, a synchronization pulse 18 is sent in a synchronisation time slot 20 which appears at the start of the symbol. The synchronisation time 20 may be termed the zero time slot or the first time slot and the terms may be used interchangeably. The synchronization pulse 18 is used to synchronise transmitter and receiver clocks. A second data pulse 22 is sent in one of a plurality of slots 14 which follow the synchronisation time slot 20. These slots may be termed data slots 14.

In this image, there only six slots but this is merely illustrative. As with conventional PPM, the number of slots relates to the number of message bits which are to be encoded. If there are M message bits, there are $2^M+1$ slots. In other words, the number of time slots determines the number of different bits which can be encoded. There is a relatively small time delay between the synchronisation pulse 18 and the data pulse 22 and the time delay is never more that the length of the symbol. The length of the symbol may be significantly smaller than the dead time. Accordingly, the use of a synchronisation pulse 18 at the beginning of each symbol greatly relaxes the accuracy required between the transmitter and receiver clocks. The transmitter is thus more likely to correctly assign the data pulse to the correct slot. Accordingly, any relative motion between the transmitter and receiver also has a much diminished effect.

Figure 4:
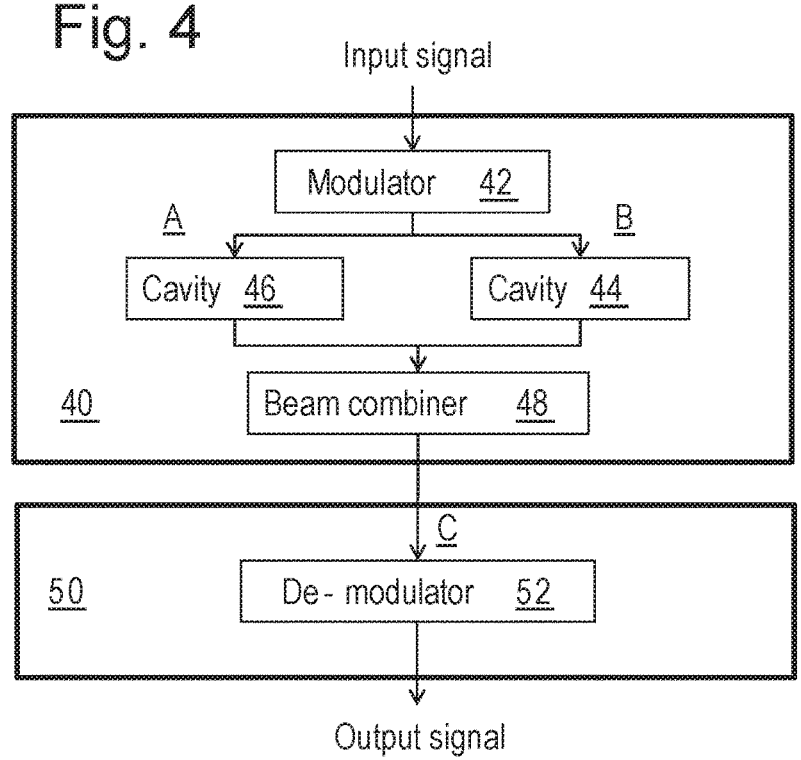
FIG. 4 is a schematic image of a system using the encoded packet of FIG. 3, according to an embodiment the present disclosure.

FIG. 4 shows an example communication system which may use the signal of FIG. 3. The system comprises a transmitter 40 having a modulator 42 for encoding an input data stream and a receiver 50 having a demodulator 52 for decoding a received PPM signal to regenerate the input data stream. This example is a free-space optical communication system which uses a laser source within the transmitter 40 to produce an optical PPM signal which is transmitted to the receiver 50. It will be appreciated that other signal sources may be used and a laser source is merely illustrative.

In this example, the laser source has two laser cavities 44, 46 in a common housing and produces a single optical output. The first laser cavity 46 receives a synch pulse trigger signal A from the modulator 42 and generates a synch pulse signal having pulses at a pre-set and fixed pulse repetition frequency (PRF) which may be below 1 kHz. The second laser cavity 44 receives a data pulse trigger signal B from the modulator 42 and generates a data pulse signal having pulses which has a precise delay (from the time of the corresponding synch pulse) so that the pulse appears in the correct data slot of the PPM symbol. As an example, the delay may be between 10 nanoseconds and 100 milliseconds. The synch pulse signal and the data pulse signal may be combined in a beam combiner 48 to generate an output optical PPM signal C which is transmitted to the receiver. This type of laser is commonly used in particle image velocimetry (PIV) but it will be appreciated that other types of laser may be used. For example, two individual lasers may be used.

Figure 5:
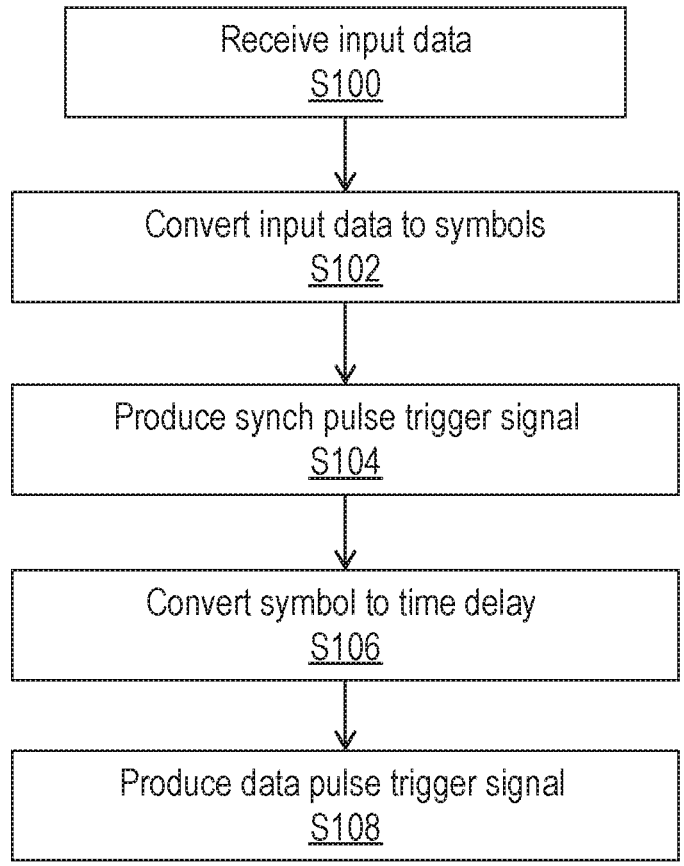
FIG. 5 is a flowchart of the steps carried out by a transmitter in the system of FIG. 4, according to an embodiment the present disclosure.

FIG. 5 is a flowchart of the steps which are carried out in the transmitter, more particularly in the modulator, according to an embodiment. In a first step S100, an input data stream in native format is received. The next step S102 is to convert this input data stream into a stream of PPM encoded symbols. A synch pulse trigger signal having a sequence of synch pulses at a fixed pulse repetition frequency is then generated S104. The timing of the synch pulses and the values of the PPM encoded symbols are used to produce a data pulse trigger signal (S106). This signal comprises a sequence of data pulses each of which have delays corresponding to the value of each PPM encoded symbol determined in step S102. It will be appreciated that the synch pulse trigger signal and the data pulse trigger signal may be generated as a single combined trigger input signal depending on the nature of the laser used.

Figure 6:
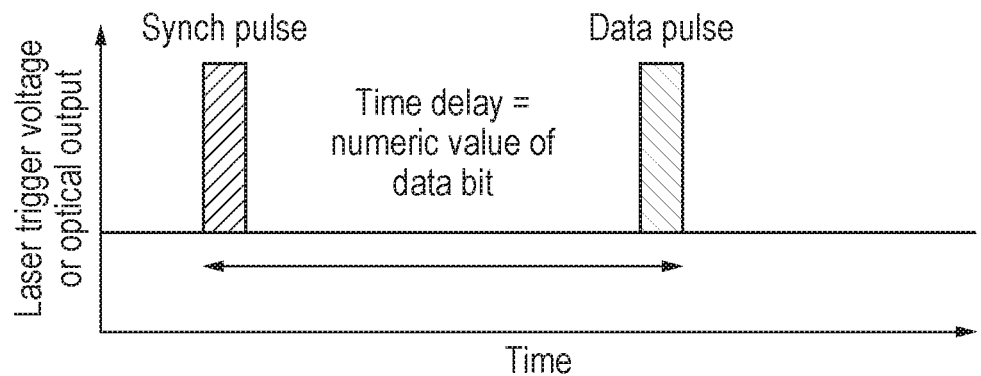
FIG. 6 is a plot showing a pair of pulses, according to an embodiment the present disclosure.

FIG. 6 shows an example of an example combined signal which may be used to trigger the laser(s), according to an embodiment. As shown, there is a synch pulse which is followed by a related data pulse. The separation (i.e. time delay) between the synch pulse and the data pulse is indicative of the numeric value of the data bit. The optical output from the transmitter would also have a similar pattern to the laser trigger voltage.

Figure 7:
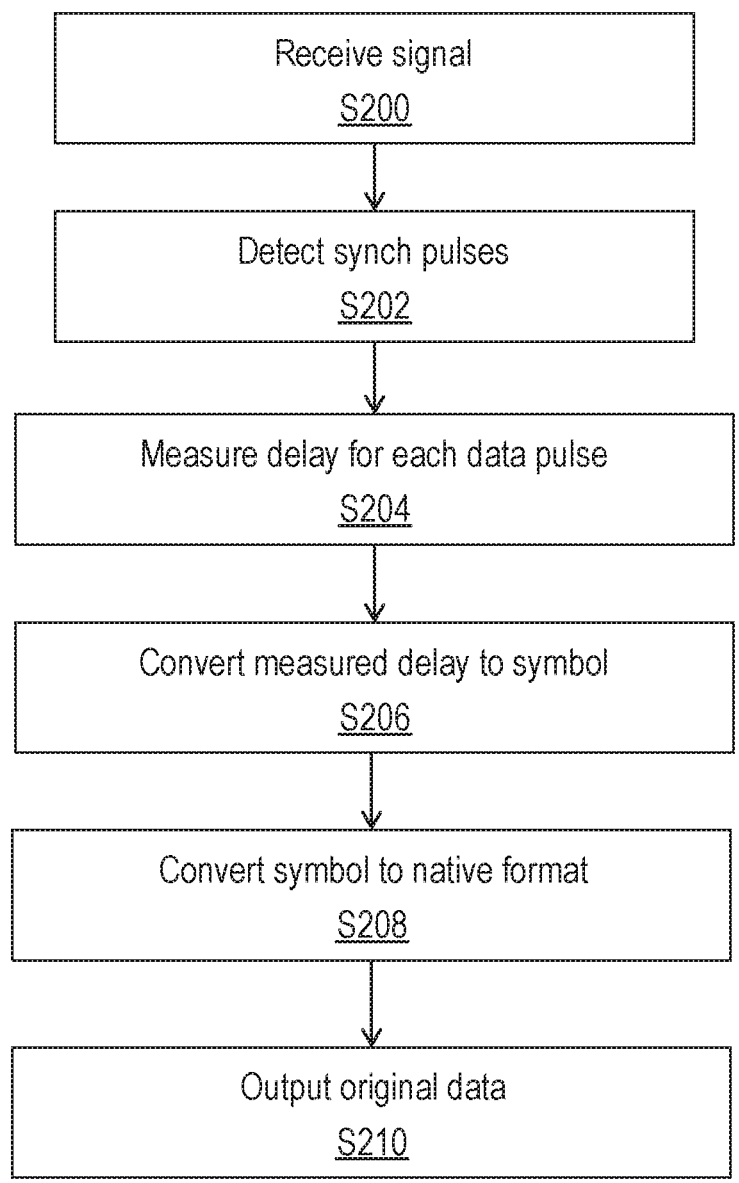
FIG. 7 is a flowchart of the steps carried out by a receiver in the system of FIG. 4, according to an embodiment the present disclosure.

FIG. 7 is a flowchart of the steps which are carried out in the receiver, more particularly in the demodulator according to an embodiment. In a first step S200, a PPM signal is received from the transmitter, for example in the arrangement shown in FIG. 4, the PPM signal is an optical signal which is detected by a high-speed optical receiver. The received signal is converted to electrical pulses and the synch pulses are detected (step S202). The receiver is able to detect the synch pulses by locating the pulses which are at a pre-set and fixed PRF. The next step is then to measure the time delay from each synch pulse to the next data pulse (step S204).

Each measured time delay is then converted to a PPM symbol value based on the data slot to which the data pulse is assigned (step S206). Each PPM symbol value is then converted back into the native data format (step S208). As an example, the native data format may be binary. The original input data is thus recovered and may be output from the receiver (step S210).

In summary, each data pulse is sent with its own proceeding synch pulse and the value of the bit is taken from the differential time delay between the synch pulse and the following data pulse. It may thus be considered to be a combination of the synchronisation pulses of conventional PPM with the relaxed timing accuracy of differential PPM (with no dead time as is required in DPPM).

The advantages of the method of PPM encoding and decoding which is described above may include for example, much reduced clock accuracy requirement and much reduced trigger timing accuracy (for the dead-time interval). There may also be much reduced on board memory required because there is no need to store the entire captured time sequence between data pulses. There may also be much reduced on-board processing because of the far shorter time sequences between synch and data pulses which are captured. There may also be greater immunity to relative movement between the transmitter and the receiver. A plurality of parallel decoding streams with different filter bandwidth parameters may also be used to find optimum receiver parameters where the incoming pulse length is unknown.

At least some of the example embodiments described herein may be constructed, partially or wholly, using dedicated special-purpose hardware. For example, a model having an FPGA chip with digital signal processing may be used to process the incoming signal and identify the time slot/bit value. Other modem designs may also be used.

Terms such as 'component', 'module', 'processor' or 'unit' used herein may include, but are not limited to, a hardware device, such as circuitry in the form of discrete or integrated components, general processing units (CPUs), a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements.

Although a few preferred embodiments have been shown and described, it will be appreciated by those skilled in the art that various changes and modifications might be made without departing from the scope of the present disclosure, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The present disclosure is not restricted to the details of the foregoing embodiment(s). The present disclosure extends to any novel one, or any novel combination, of the features disclosed in this specification (including any accompanying claims, abstract and drawings), or to any novel one, or any novel combination, of the steps of any method or process so disclosed.

The invention claimed is:

1. A method for encoding a data signal as a pulse position modulation (PPM) signal, the method comprising:
   receiving an input data signal;
   converting data within the input data signal to a sequence of PPM symbol values; and
   generating a PPM signal comprising an alternating sequence of synchronisation pulses and data pulses by
      generating a plurality of synchronisation pulses at a fixed pulse repetition rate,
      converting each of the PPM symbol values into a time delay from a preceding synchronisation pulse, and
      generating a sequence of data pulses with each data pulse having the respective time delay from the preceding synchronisation pulse, whereby the sequence of data pulses represent the sequence of PPM symbol values.

2. The method of claim 1, wherein each symbol value corresponds to one of a plurality of time slots, and generating a sequence of data pulses comprises assigning each data pulse to a time slot.

3. The method of claim 2, wherein each time slot is less than 10 μs in length.

4. The method of claim 2, wherein there are no further time slots after the time slot to which a data pulse is assigned.

5. The method of claim 1, wherein the PPM signal comprises dead-time before each synchronisation pulse.

6. The method of claim 5, wherein the dead-time is fixed.

7. The method of claim 5, wherein the dead-time is more than 1 ms.

8. The method of claim 1, wherein the PPM signal is an optical PPM signal.

9. A method for decoding the PPM signal of claim 1, the method comprising:
   receiving the PPM signal;
   detecting each synchronisation pulse within the PPM signal;
   measuring the time delay from each detected synchronisation pulse to the subsequent data pulse;

converting each measured time delay to a PPM symbol value; and converting each PPM symbol value to regenerate the input data signal.

10. A communication system configured to carry out the method of claim 9.

11. A communication system configured to carry out the method of claim 1.

12. A transmitter for transmitting a data signal encoded as a pulse position modulation (PPM) signal, the transmitter comprising:

a modulator; and a signal generator, wherein the modulator is configured to receive an input data signal, convert data within the input data signal to a sequence of PPM symbol values, generate a trigger signal, and send the trigger signal to the signal generator; and wherein the signal generator is configured to generate the PPM signal comprising an alternating sequence of synchronisation pulses and data pulses on receipt of the trigger signal, wherein the PPM signal comprises a plurality of synchronisation pulses at a fixed pulse repetition rate and a sequence of data pulses with each data pulse having a time delay from a preceding synchronisation pulse, whereby the sequence of data pulses represent the sequence of PPM symbol values.

13. The transmitter of claim 12, wherein the signal generator comprises a laser source and the generated PPM signal is an optical signal.

14. The transmitter of claim 13, wherein the laser source comprises: a first cavity for generating the plurality of synchronisation pulses; and a second cavity for generating the sequence of data pulse; and wherein the trigger signal comprises a synchronisation pulse trigger signal which is sent to the first cavity and a separate data pulse trigger signal which is sent to the second cavity.

15. An optical communication system comprising the transmitter of claim 13.

16. A communication system comprising the transmitter of claim 12.

17. A receiver for decoding a pulse position modulation (PPM) signal, the receiver comprising:

a demodulator configured to receive an input pulse position modulation (PPM) signal comprising an alternating sequence of synchronisation pulses and data pulses wherein the plurality of synchronisation pulses are at a fixed pulse repetition rate and each data pulse has a time delay from a preceding synchronisation pulse, detect each synchronisation pulse within the PPM signal, measure the time delay from each detected synchronisation pulse to the subsequent data pulse, convert each measured time delay to a PPM symbol value, and convert each PPM symbol value to regenerate the original input data signal.

18. The receiver of claim 17, wherein the PPM signal is an optical signal and the demodulator is further configured to convert the received PPM signal to a plurality of electrical pulses before detecting each synchronisation pulse.

19. An optical communication system comprising the receiver of claim 18.

20. A communication system comprising the receiver of claim 17.

* * * * *